(12) United States Patent
Bordery et al.

(10) Patent No.: US 11,332,891 B2
(45) Date of Patent: May 17, 2022

(54) MOLD FOR ALUMINOTHERMIE WELDING OF A METAL RAIL AND REPAIR METHOD MAKING USE THEREOF

(71) Applicant: Pandrol, Raismes (FR)

(72) Inventors: Pierre Bordery, Vieux Conde (FR); Frédéric Delcroix, Helesmes (FR)

(73) Assignee: Pandrol

( * ) Notice: Subject to any disclaimer, the term of this patent is extended or adjusted under 35 U.S.C. 154(b) by 550 days.

(21) Appl. No.: 16/096,999

(22) PCT Filed: May 2, 2017

(86) PCT No.: PCT/FR2017/051038
§ 371 (c)(1),
(2) Date: Oct. 26, 2018

(87) PCT Pub. No.: WO2017/187110
PCT Pub. Date: Nov. 2, 2017

(65) Prior Publication Data
US 2019/0127925 A1      May 2, 2019

(30) Foreign Application Priority Data
Apr. 29, 2016 (FR) ..................................... 1653859

(51) Int. Cl.
*B23K 23/00* (2006.01)
*E01B 31/15* (2006.01)
(Continued)

(52) U.S. Cl.
CPC .............. *E01B 31/15* (2013.01); *B23K 23/00* (2013.01); *E01B 31/13* (2013.01); *E01B 31/18* (2013.01); *B23K 2101/26* (2018.08)

(58) Field of Classification Search
CPC .. B23K 2101/26; B23K 23/00; B23K 11/046; B23K 11/36
See application file for complete search history.

(56) References Cited

U.S. PATENT DOCUMENTS

| 4,875,657 A | 10/1989 | Moller et al. |
| 2007/0272114 A1* | 11/2007 | Delcroix ................... B22C 9/02 104/2 |
| 2019/0004885 A1 | 1/2019 | Pelletier et al. |

FOREIGN PATENT DOCUMENTS

| CN | 205184046 U | 4/2016 |
| EP | 0637480 A1 | 2/1995 |

(Continued)

OTHER PUBLICATIONS

International Search Report from Application No. PCT/FR2017/051038 dated Jul. 12, 2017, 2 pages.
(Continued)

*Primary Examiner* — Erin B Saad
(74) *Attorney, Agent, or Firm* — Lerner, David, Littenberg, Krumholz & Mentlik, LLP

(57) ABSTRACT

The present invention relates in particular to a mold (M) for aluminothermic welding of a metal rail (1), which comprises at least two substantially identical pieces or shells (4), configured to be temporarily assembled opposite one another and on either side of said rail (1) to enclose the head (10), web (11) and foot (12) of this rail (1), each piece or shell (4) having an upper opening (43), which opens onto an internal cavity (44) bounded by walls (45, 46, 48) configured to enclose the head (10), the web (11) and the foot (12) of said rail (1), characterized by the fact that said internal cavity (44) comprises a compressible sealing coating (5) only against the walls (451, 46, 48) configured to enclose said web (11), foot (12) and underside of the head (10), with the exception of the rest of the head (10) and the underside of the foot (12).

6 Claims, 4 Drawing Sheets

(51) Int. Cl.
*E01B 31/18* (2006.01)
*E01B 31/13* (2006.01)
*B23K 101/26* (2006.01)

(56) References Cited

FOREIGN PATENT DOCUMENTS

| | | | |
|---|---|---|---|
| FR | 1561465 | A | 3/1969 |
| FR | 2890668 | A1 | 3/2007 |
| FR | 3044437 | A1 | 6/2017 |
| JP | S5418448 | A | 2/1979 |
| JP | 2005220727 | A | 8/2005 |
| JP | 2014104508 | A | 6/2014 |
| KR | 100762940 | B1 | 10/2007 |
| RU | 80459 | U1 | 2/2009 |

OTHER PUBLICATIONS

Preliminary Search Report for Application No. FR 1653859 dated Jan. 9, 2017, 2 pages.

\* cited by examiner

MOLD FOR ALUMINOTHERMIE WELDING OF A METAL RAIL AND REPAIR METHOD MAKING USE THEREOF

CROSS-REFERENCE TO RELATED APPLICATIONS

The present application is a national phase entry under 35 U.S.C. § 371 of International Application No. PCT/FR2017/051038, filed May 2, 2017, which claims priority from French Patent Application No. 1653859, filed Apr. 29, 2016, all of which are incorporated herein by reference.

FIELD OF THE INVENTION

The present invention pertains to a mold for repairing metal rails, notably railroad rails.

It also relates to a method for repairing a rail that makes use of such a mold.

TECHNOLOGICAL BACKGROUND OF THE INVENTION

Throughout the present application, the term "foot" will be used to designate the bottom part of the rail that rests on a tie, whereas the terms "head" and "web" will respectively designate the running track and the stem of vertical orientation that connects the foot to the head. This definition applies for all types of feet, whether they are of "Vignole" profile or other.

Here the concern is more specifically rails of which the upper part of the head is degraded.

This degradation usually results from wear of the rail or from running incidents, such that the running surface is no longer uniform but rather has surface irregularities which can compromise safety.

In such situations, it is known to intervene on site, to cut out the portion of rail affected by the degradation, to replace it by a "replacement rail section", that is to say a section of new rail, and to weld this section to the pre-existing rail.

It is easily understood that such an operation is expensive, tedious and time consuming. Even if it could be justified when the degradation is very considerable, it does not have real reason to be justified when the defect has a limited extent in terms of depth and length.

However, from the moment that it is proposed to repair the rail directly by aluminothermic welding, the following difficulties could be faced.

An on-site intervention procedure is known that makes use of a mold wholly constituted of sand. The mold is placed on either side of a region of the rail from which the defect has been removed, and molten steel obtained by aluminothermic reaction is poured into the mold so as to fill the hollowing out created by the removal of the defect.

It is generally necessary to carry out bedding in of the sand mold against the mold to adjust as best as possible the contact surfaces with a view to ensuring leak tightness vis-à-vis the molten metal that will be poured into the mold, which is a condition for the success of the repair. This operation is tedious and does not always make it possible to obtain perfect leak tightness.

Furthermore, it cannot be excluded that the defect to be repaired is located in a zone in which, at the moment of laying the railway line, two rail sections have been welded together by electric welding (or "flash butt welding") which generates excessive thicknesses that can reach up to three millimeters. Obviously, the seams and other welding traces present on the head have been carefully eliminated, notably by grinding. This is not on the other hand the case on the other parts of the rail that do not constitute running surfaces.

Seams resulting from electric welds present elsewhere than on the head could be ground before repairing the rail. But this is in practice difficult to envisage because the operators have limited time available for carrying out the repair, the track having to be closed to traffic for a duration that is as short as possible. Yet, such a grinding would have to be carried out in a meticulous manner in order to ensure a perfectly leak tight contact surface between the rail and the mold.

In these conditions, it is easily understood that these surface irregularities pose problems of leak tightness from the moment that it is proposed to repair a damaged rail by aluminothermic welding in a mold which encloses on either side the whole of the rail in the damaged zone.

The present invention specifically aims to correct this shortcoming.

SUMMARY OF THE INVENTION

Thus, in a first aspect, the present invention pertains to a mold for aluminothermic welding of a metal rail, which comprises at least two substantially identical pieces or shells, configured to be temporarily assembled opposite one another and on either side of said rail to enclose the head, web and foot of this rail, each piece or shell having an upper opening which opens onto an internal cavity bounded by walls configured to enclose the head, the web and the foot of said rail, characterized by the fact that said internal cavity comprises a compressible sealing coating only against the wall configured to enclose said web, foot and underside of the head, with the exception of the rest of the head and the underside of the foot.

According to one embodiment, said coating is refractory felt.

According to one embodiment, the thickness of said coating is comprised between 2 and 10 mm.

In a particularly advantageous manner, the lower part of the piece opposite to the cavity has an inclined cut configured to avoid contact with a system for attaching the rail on a tie.

A second aspect of the invention relates to a method for repairing a rail that has a surface defect at the level of its head, characterized by the fact that it comprises the following steps which consist in:

removing said defect so as to create a hollowing out on the head of said rail;

positioning the two pieces or shells of a mold as described above on either side of this rail;

filling said hollowing out by pouring into said mold, via said upper opening, an aluminothermic welding material.

According to one embodiment, the web has, substantially in line with the defect to be repaired, a weld seam resulting from electric welding and the compressible coating of the mold is intimately applied on said seam.

BRIEF DESCRIPTION OF THE DRAWINGS

Other characteristics and advantages of the invention will become clear on reading the following description of a preferred embodiment of the invention. This description is made with reference to the appended drawings in which.

DETAILED DESCRIPTION OF THE INVENTION

Figure 1:
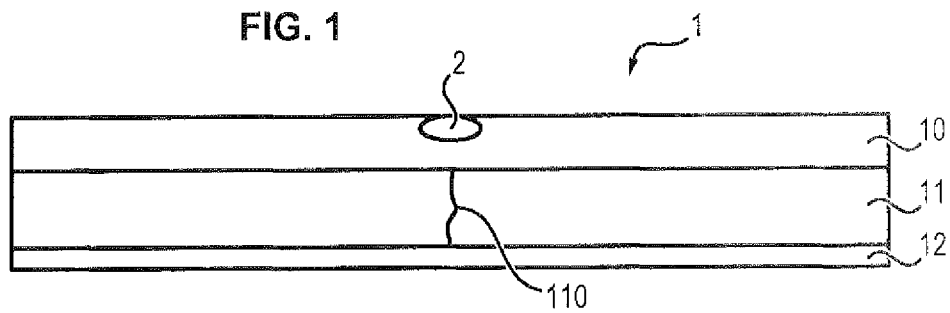
FIG. 1 is a very simplified side view of a rail section having a surface defect at the level of its running part (head), as well as a superficial trace of welding at the level of its web.

In FIG. 1 a metal railroad rail section is schematically represented.

In a manner well known per se, this rail comprises a head 10, a web 11 and a foot 12. A surface defect that the head 10 has at the level of its upper running surface is referenced 2. This defect occupies for example a surface area of several cm2.

Substantially in line with the defect 2 extends, at the level of the web 11, a welding seam 110 resulting from electric welding. This seam forms an irregularity on the surface of the web 11.

It is typically this type of rail that it is proposed to repair by means of the mold according to the invention.

Figure 2:
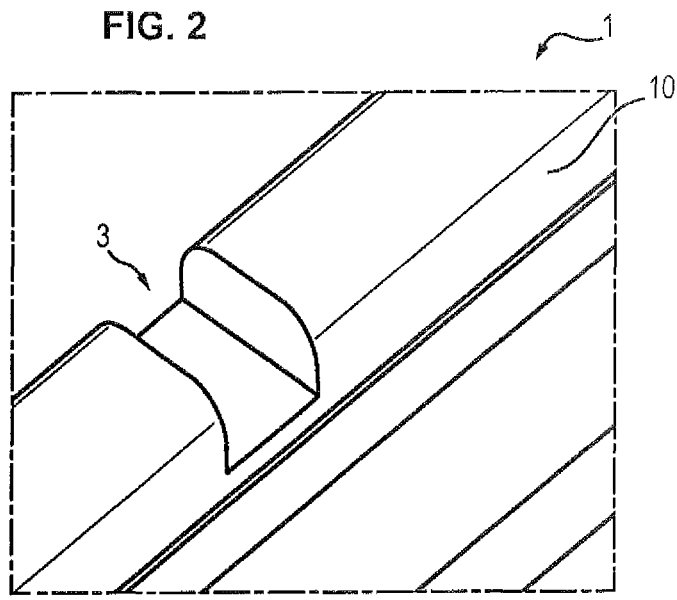
FIG. 2 is a perspective view of the part of the rail of FIG. 1 having a surface defect, after removal of a portion of material that encompasses this defect.
Figure 3:
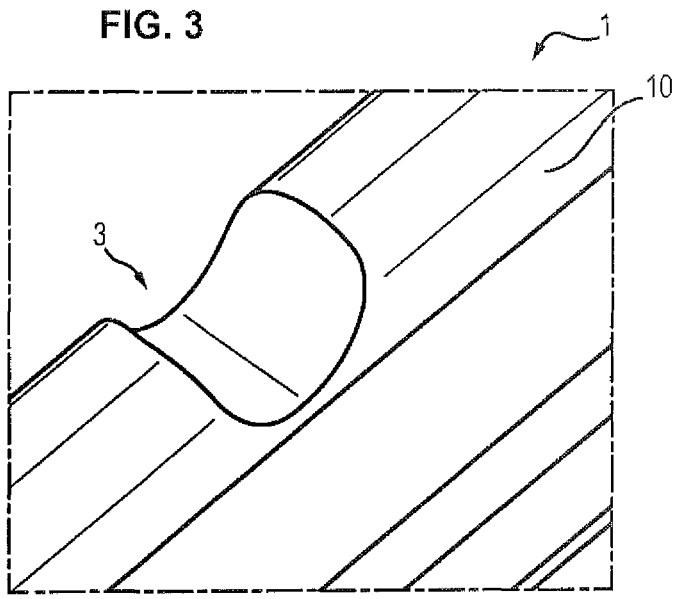
FIG. 3 is a view analogous to FIG. 2, the portion of removed material having however a different shape.

FIGS. 2 and 3 show a smaller part of this same rail, represented while the surface defect 2 has been removed beforehand, such that the presence of a hollowing out 3 on the surface of the head 10 is noted.

The shape of the hollowing out 3 is a function of the technique that has been used for the removal operation. Thus, in FIG. 2, the removed zone has two straight edges perpendicular to each other, obtained by grinding of the rail whereas, in FIG. 3, the hollowing out has a curved bottom obtained by oxygen cutting. This shape has no influence on the characteristics of the mold and the method according to the present invention. Naturally, those skilled in the art could choose any other appropriate surface defect removal technique without however going beyond the scope of the present invention.

Figure 4:
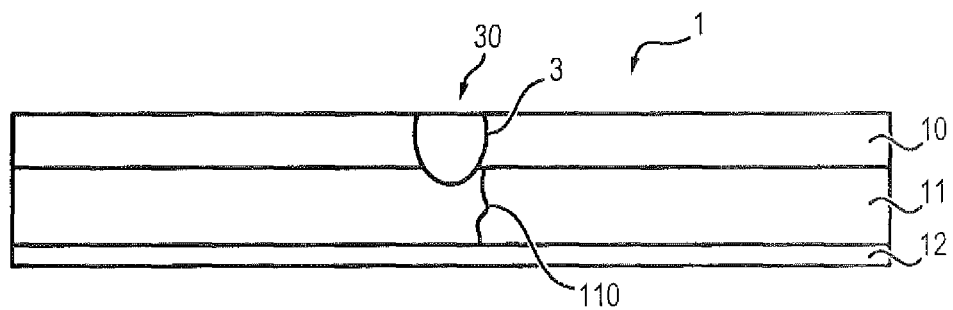
FIG. 4 is a figure analogous to FIG. 1 showing the rail after repair.

In FIG. 4 is represented what constitutes, as it were, the objective of the present invention, in this instance a repaired rail 1 which has a filling material 30, in place of the hollowing out 3 of FIGS. 2 and 3.

Figure 5:
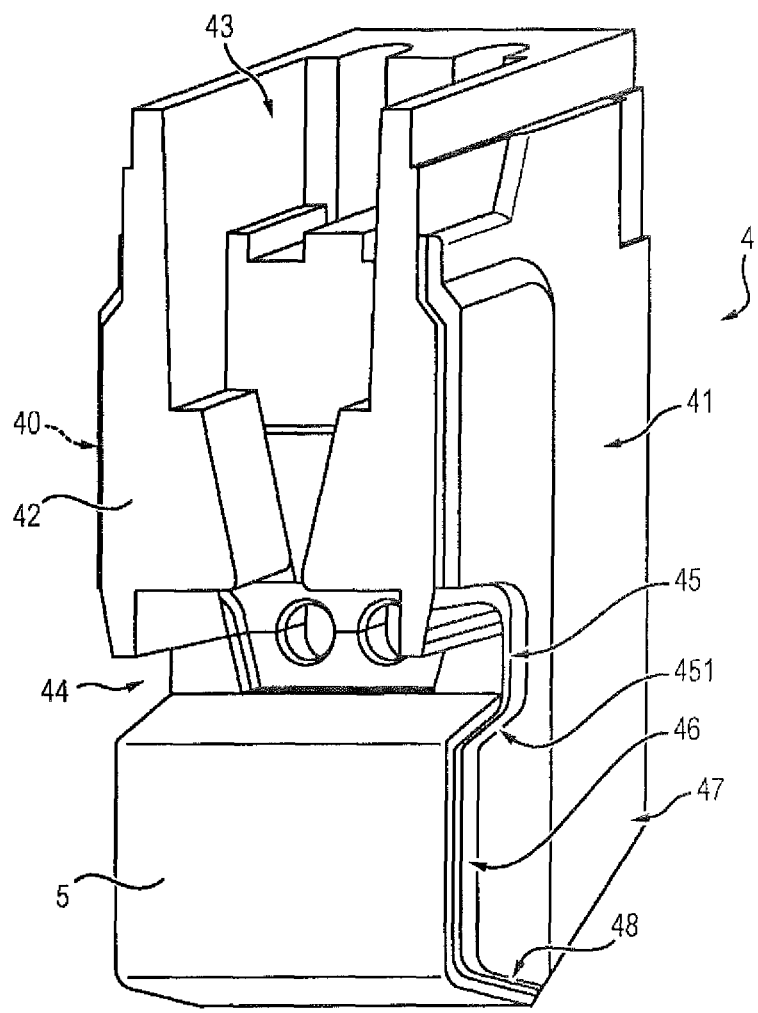
FIGS. 5 and 6 are perspective views, along two different directions, of a part of a mold according to the present invention.
Figure 6:
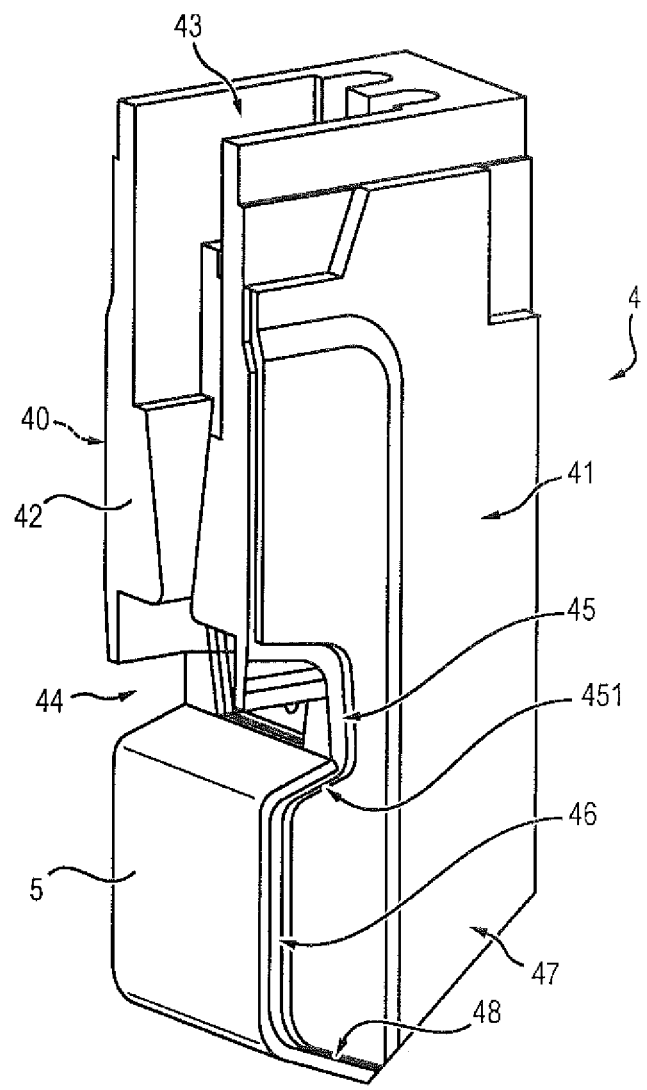

Reference will now be made more specifically to FIGS. 5 and 6 to describe the mold according to the invention.

This mold is constituted of two substantially identical pieces (or shells) 4, preferentially and exclusively formed of sand. No more details will be given on the manner of manufacturing such a mold, because it is known per se and does not constitute the core of the invention.

For greater clarity, a single piece 4 has been represented here. It is laterally bounded by two parallel faces 40 and 41. It has in its lower part a frontal face 42 which is divided into two parts arranged on either side of an opening 43 that connects the upper part of the mold with the lower molding cavity 44 that it has.

The lower part of the mold is organized into two regions: the molding cavity 44 intended to be arranged around the head of the rail, which is bounded by a wall 45, and a bearing surface against the web and the foot of the rail, formed by walls 46, 48.

The wall 45 is configured to enclose the head 10 of the rail 1, whereas the wall 46 is intended to enclose the web 11 and the wall 48 is intended to enclose the foot 12 of the rail. The wall 45 notably includes a part 451 that is intended to be in contact with the underside of the head.

According to the invention, the lower part of the mold comprises a compressible sealing coating 5 only against the walls 451, 46 and 48 configured to enclose said web, foot and underside of the head, with the exception of the rest of the head and the underside of the foot.

According to an advantageous embodiment, this coating is constituted of refractory felt. It is made integral with the walls by means of an adhesive. The thickness of the coating is typically comprised between 2 and 10 mm.

According to an advantageous embodiment, the lower part of the piece 4 opposite to the cavity 44 has a more pronounced inclined cut 47 than on conventional molds for aluminothermic welding, in order to make it possible to place the mold at any emplacement of the rail. Indeed, if the repair has to be carried out in line with an electric welding positioned on a tie, attachment systems (bolts, lag screws, etc.) extend above the foot of the rail. In order to avoid the pieces of the mold entering into contact with these systems (which would make the putting in place of the mold impossible), said inclined cut 47 is designed to make it possible to place this mold on any attachment system.

Figure 7:
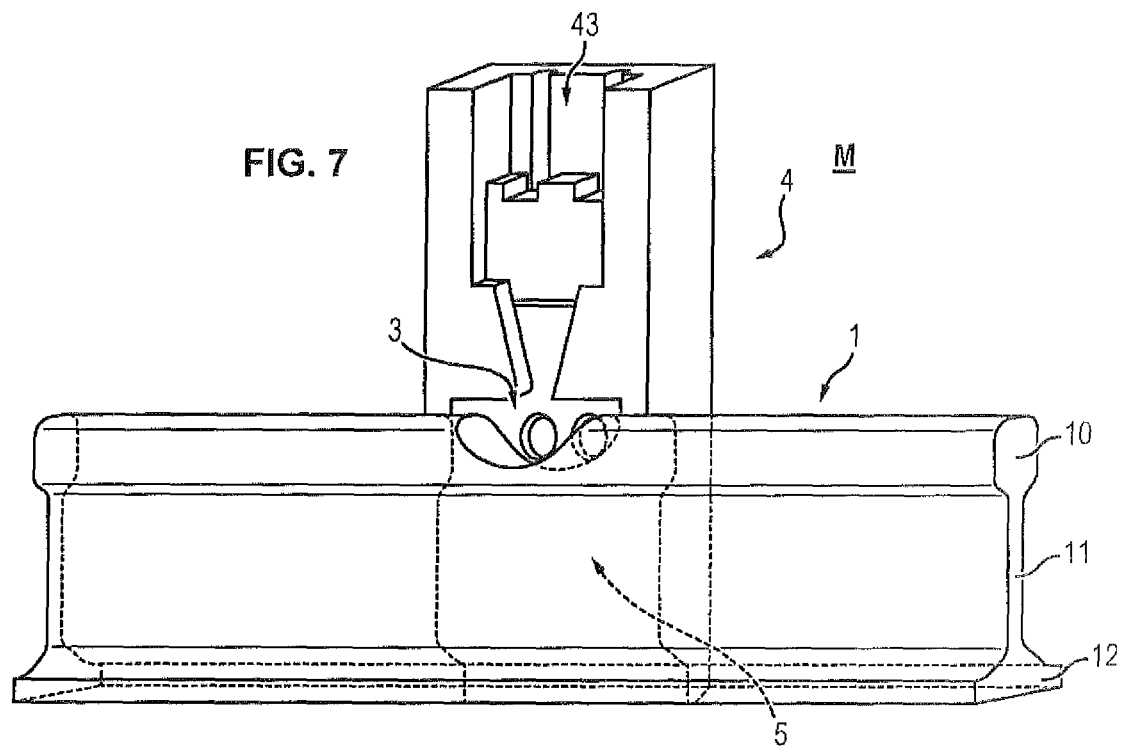
FIGS. 7 and 8 are perspective views of a rail section to be repaired, represented relative to a part of mold according to the invention, said section being visible in FIG. 7 by transparency.
Figure 8:
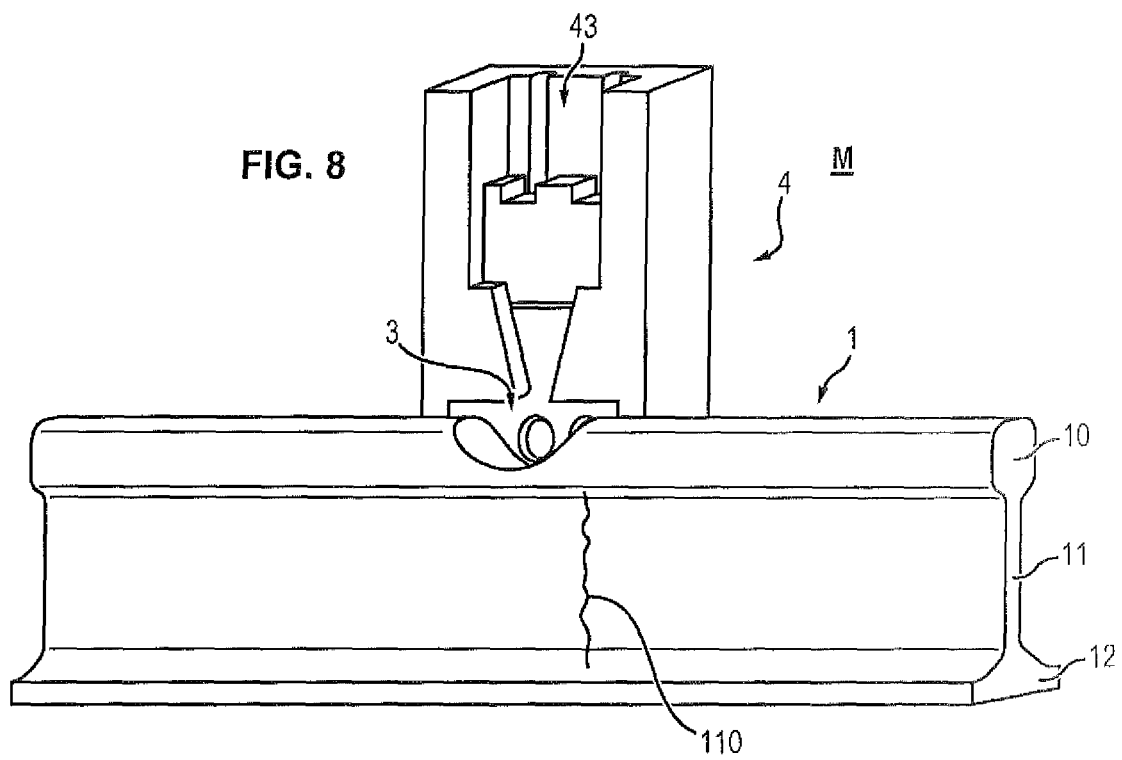

Referring to FIGS. 7 and 8, it is easily understood how the two parts 4 of the mold M are positioned, on either side of the rail 1, in such a way that the opening 43 is located vertically to the hollowing out 3.

When this positioning is carried out and when all the operations preparatory to this type of operation have been implemented, the pouring of an aluminothermic material to fill the hollowing out 3 is carried out.

Due to the fact that the compressible coating is situated facing regions likely to have surface irregularities such as electric welding seams, this material deforms and is intimately applied against these irregularities. In doing so, there is no risk that the molten material flows elsewhere than in the region concerned, that is to say that of the hollowing out.

The invention claimed is:

1. A mold for repairing a head of a metal rail by aluminothermic welding, the mold comprising at least two substantially identical pieces or shells, configured to be temporarily assembled opposite one another and on either side of said rail to enclose the head, web and foot of the rail, each piece or shell having an upper opening, which opens onto an internal cavity bounded by walls configured to enclose the head, the web and the foot of said rail, wherein said internal cavity comprises a compressible sealing coating only against the walls configured to enclose said web, foot and underside of the head, the rest of the head and the underside of the foot being devoid of any compressible sealing coating.

2. The mold according to claim 1, wherein said coating is refractory felt.

3. The mold according to claim 1, wherein the thickness of said coating is comprised between 2 and 10 mm in an uncompressed state.

4. The mold according to claim 1, wherein a lower part of at least one of the substantially identical pieces or shells has an inclined cut configured to avoid contact with a system for attaching the rail on a tie.

5. A method for repairing a rail that has a surface defect at the level of its head, wherein the method comprises the following steps:
- removing said defect so as to create a hollowing out on the head of said rail;
- positioning the two pieces or shells of a mold according to claim 1 on either side of this rail; and
- filling said hollowing out by pouring into said mold, via said upper opening, an aluminothermic welding material.

6. The method according to claim 5, wherein the web has, substantially in line with the defect to be repaired, a weld seam resulting from electric welding and that the compressible coating is intimately applied on said seam.

\* \* \* \* \*